(12) United States Patent
Zhou et al.

(10) Patent No.: US 12,294,900 B2
(45) Date of Patent: May 6, 2025

(54) TECHNIQUES FOR PRIORITIZATION ASSOCIATED WITH A CELL GROUP CHANGE

(71) Applicant: QUALCOMM Incorporated, San Diego, CA (US)

(72) Inventors: Yan Zhou, San Diego, CA (US); Tao Luo, San Diego, CA (US); Olufunmilola Omolade Awoniyi-Oteri, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/325,184

(22) Filed: May 30, 2023

(65) Prior Publication Data

US 2023/0300693 A1    Sep. 21, 2023

Related U.S. Application Data

(62) Division of application No. 16/948,098, filed on Sep. 3, 2020, now Pat. No. 11,706,672.

(Continued)

(51) Int. Cl.
*H04W 76/30* (2018.01)
*H04W 24/08* (2009.01)
(Continued)

(52) U.S. Cl.
CPC ....... *H04W 36/0077* (2013.01); *H04W 24/08* (2013.01); *H04W 36/087* (2023.05);
(Continued)

(58) Field of Classification Search
CPC . H04W 36/0077; H04W 76/30; H04W 76/27; H04W 72/53; H04W 36/087;
(Continued)

(56) References Cited

U.S. PATENT DOCUMENTS

| 11,057,958 B2 | 7/2021 | Xiao et al. |
| 2015/0173120 A1 | 6/2015 | Yamada |

(Continued)

FOREIGN PATENT DOCUMENTS

| CN | 106471858 A | 3/2017 |
| CN | 107690163 A | 2/2018 |

(Continued)

OTHER PUBLICATIONS

3GPP TS 37.340, "3rd Generation Partnership Project; Technical Specification Group Radio Access Network; Evolved Universal Terrestrial Radio Access (E-UTRA) and NR; Multi-Connectivity; Stage 2 (Release 15)", 3GPP TS 37.340, 3rd Generation Partnership Project, Mobile Competence Centre, 650, Route Des Lucioles, F-06921 Sophia-Antipolis Cedex, France, vol. RAN WG2, No. V1.1.1 (Oct. 2017), Nov. 6, 2017, pp. 1-50, XP051391628, paragraph [03.1], [07.3] and [10.3.1] figures 10.3.1-1.

(Continued)

*Primary Examiner* — Un C Cho
*Assistant Examiner* — Lalita W Pace
(74) *Attorney, Agent, or Firm* — Harrity & Harrity, LLP

(57) ABSTRACT

Various aspects of the present disclosure generally relate to wireless communication. In some aspects, a user equipment (UE) may connect to a set of source cell groups (CGs). The UE may receive a target cell group setup information, the target cell group setup information being associated with a set of target CGs. The UE may connect to the set of target CGs based at least in part on the target cell group setup information during a handover from the set of source CGs to the set of target CGs. The UE may disconnect from the set of source CGs after connecting to the set of target CGs. Numerous other aspects are provided.

20 Claims, 9 Drawing Sheets

Related U.S. Application Data

(60) Provisional application No. 62/897,107, filed on Sep. 6, 2019.

(51) Int. Cl.
| | | |
|---|---|---|
| *H04W 36/00* | (2009.01) | |
| *H04W 36/08* | (2009.01) | |
| *H04W 36/18* | (2009.01) | |
| *H04W 36/36* | (2009.01) | |
| *H04W 72/044* | (2023.01) | |
| *H04W 72/53* | (2023.01) | |
| *H04W 76/11* | (2018.01) | |
| *H04W 76/27* | (2018.01) | |

(52) U.S. Cl.
CPC .......... *H04W 36/18* (2013.01); *H04W 36/36* (2013.01); *H04W 72/046* (2013.01); *H04W 72/53* (2023.01); *H04W 76/11* (2018.02); *H04W 76/27* (2018.02); *H04W 76/30* (2018.02); *H04W 36/0055* (2013.01); *H04W 36/0069* (2018.08)

(58) Field of Classification Search
CPC ..... H04W 24/08; H04W 36/18; H04W 36/36; H04W 72/046; H04W 36/0069; H04W 36/0066; H04W 36/185
See application file for complete search history.

(56) References Cited

U.S. PATENT DOCUMENTS

| | | |
|---|---|---|
| 2015/0215965 A1 | 7/2015 | Yamada et al. |
| 2015/0264621 A1 | 9/2015 | Sivanesan et al. |
| 2015/0271726 A1 | 9/2015 | Kim et al. |
| 2017/0188335 A1 | 6/2017 | Uchino et al. |
| 2018/0027457 A1 | 1/2018 | Xu et al. |
| 2018/0220336 A1 | 8/2018 | Hong et al. |
| 2018/0220344 A1 | 8/2018 | Shaheen |
| 2018/0302834 A1 | 10/2018 | Zhang et al. |
| 2019/0069285 A1* | 2/2019 | Chandrasekhar ..... H04W 72/23 |
| 2019/0150123 A1* | 5/2019 | Nogami ................ H04W 72/23 370/330 |
| 2019/0150217 A1 | 5/2019 | Kim |
| 2019/0253945 A1 | 8/2019 | Paladugu et al. |
| 2020/0045569 A1* | 2/2020 | Seo ....................... H04W 72/23 |
| 2020/0154467 A1* | 5/2020 | Gong .................... H04W 76/27 |
| 2020/0221485 A1* | 7/2020 | Cirik ................... H04L 25/0224 |
| 2020/0260347 A1 | 8/2020 | Xu et al. |
| 2021/0076273 A1 | 3/2021 | Zhou et al. |
| 2022/0046494 A1 | 2/2022 | Yiu |
| 2022/0264387 A1 | 8/2022 | Kim et al. |

FOREIGN PATENT DOCUMENTS

| | | |
|---|---|---|
| CN | 109997385 A | 7/2019 |
| WO | 2018057076 A1 | 3/2018 |

OTHER PUBLICATIONS

International Search Report and Written Opinion—PCT/US2020/070501—ISA/EPO—Feb. 11, 2021.
Partial International Search Report—PCT/US2020/070501—ISA/EPO—Dec. 21, 2020.
3GPP TS 37.340, "3rd Generation Partnership Project, Technical Specification Group Radio Access Network, Evolved Universal Terrestrial Radio Access (E-UTRA) and NR, Multi-connectivity, Stage 2 (Release 15)", 3GPP TS 37.340,.V15.5.0, vol. RAN WG2, Mar. 29, 2019, pp. 1-68, XP051692163.

* cited by examiner

TECHNIQUES FOR PRIORITIZATION ASSOCIATED WITH A CELL GROUP CHANGE

CROSS-REFERENCE TO RELATED APPLICATION

This application is a divisional of U.S. patent application Ser. No. 16/948,098, filed on Sep. 3, 2020, entitled "TECHNIQUES FOR PRIORITIZATION ASSOCIATED WITH A CELL GROUP CHANGE," which claims priority to U.S. Provisional Patent Application No. 62/897,107, filed on Sep. 6, 2019, entitled "TECHNIQUES FOR PRIORITIZATION ASSOCIATED WITH A CELL GROUP CHANGE," the contents of which are incorporated herein by reference in their entireties.

FIELD OF THE DISCLOSURE

Aspects of the present disclosure generally relate to wireless communication and more particularly to techniques for prioritization associated with a cell group (CG) change.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include connecting to a set of source cell groups (CGs); receiving a target cell group setup information, the target cell group setup information is associated with a set of target CGs; connecting to the set of target CGs based at least in part on the target cell group setup information during a handover from the set of source CGs to the set of target CGs; and disconnecting from the set of source CGs after connecting to the set of target CGs.

In some aspects, the set of source CGs and the set of target CGs include a set of source secondary CGs and a set of target secondary CGs, respectively.

In some aspects, the set of source CGs and the set of target CGs include a set of source master CGs and a set of target master CGs, respectively.

In some aspects, the target cell group setup information includes at least one of: a target cell group identifier, a primary cell identifier, a set of secondary cell identifiers, or a configuration per cell.

In some aspects, the UE maintains a connection with the set of source CGs and a connection with the set of target CGs from a time of the connecting to the set of target CGs until a time of the disconnecting from the set of source CGs.

In some aspects, the target cell group setup information is received in a target cell group setup information element included in a radio resource control reconfiguration message.

In some aspects, a number of target cell CGs in the set of CGs is based at least in part on a UE capability signaled by the UE.

In some aspects, the disconnect from the set of source CGs is triggered based at least in part on an CG switching indication received in a radio resource control (RRC) reconfiguration message. In some aspects, the CG switching indication includes a cell group identifier associated with the set of target CGs. In some aspects, the RRC reconfiguration message further includes an indication to release the set of source CGs.

In some aspects, a method of wireless communication, performed by a user equipment (UE), may include determining that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells; selecting, based at least in part on a prioritization rule, either the first CORESET or the second CORESET as a CORESET in which to monitor PDCCH candidates; and monitoring PDCCH candidates in the overlapping PDCCH monitoring occasions in the selected CORESET.

In some aspects, the set of source cells is in a set of source secondary cell groups (SCGs) and the set of target cells is in a set of target SCGs.

In some aspects, the first CORESET and the second CORESET have the same quasi co-location TypeD properties.

In some aspects, the first CORESET and the second CORESET have different quasi co-location TypeD properties. In some aspects, the prioritization rule is based at least in part on search space types associated with the first CORESET and the second CORESET.

In some aspects, the prioritization rule prioritizes CORESETs configured for common search spaces over CORESETs configured for UE-specific search spaces.

In some aspects, the prioritization rule prioritizes CORESETs configured for UE-specific search spaces over CORESETs configured for common search spaces.

In some aspects, the prioritization rule is based at least in part on cell identifiers associated with the set of source cells and cell identifiers associated with the set of target cells. In some aspects, the prioritization rule prioritizes CORESETs configured for cells with lower cell identifiers over CORESETs configured for cells with higher cell identifiers. In some aspects, the prioritization rule prioritizes CORESETs configured for cells with higher cell identifiers over CORESETs configured for cells with lower cell identifiers.

In some aspects, the prioritization rule is based at least in part on search space identifiers associated with the first CORESET and the second CORESET. In some aspects, the prioritization rule prioritizes CORESETs configured for search spaces with lower search space identifiers over CORESETs configured for search spaces with higher search space identifiers. In some aspects, the prioritization rule prioritizes CORESETs configured for search spaces with higher search space identifiers over CORESETs configured for search spaces with lower search space identifiers.

In some aspects, the prioritization rule is based at least in part on cell types of the set of source cells and the set of target cells. In some aspects, the prioritization rule prioritizes CORESETs configured for target cells over CORESETs configured for source cells. In some aspects, the prioritization rule prioritizes CORESETs configured for source cells over CORESETs configured for target cells.

In some aspects, the UE may monitor PDCCH candidates in the overlapping PDCCH monitoring occasions in another CORESET, wherein quasi co-location (QCL) TypeD properties of the other CORESET match QCL TypeD properties of the selected CORESET.

In some aspects, a method of wireless communication, performed by a user equipment (UE), may include determining that the UE is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the UE is connected to both a set of source cells and a set of target cells during a handover from the set of source cells to the set of target cells, and wherein the set of source cells is associated with a first default PDSCH beam and the set of target cells is associated with a second default PDSCH beam; identifying the first default PDSCH beam or the second default PDSCH beam as a default PDSCH beam to be used for receiving the PDSCH; and receiving the PDSCH using the identified default PDSCH beam.

In some aspects, the set of source cells is in a set of source secondary cell groups (SCGs) and the set of target cells is in a set of target SCGs.

In some aspects, when a single default PDSCH beam is to be used for receiving the PDSCH, the second default PDSCH beam, associated with the set of target cells, is identified as the default PDSCH beam to be used for receiving the PDSCH.

In some aspects, when a single default PDSCH beam is to be used for receiving the PDSCH, the first default PDSCH beam, associated with the set of source cells, is identified as the default PDSCH beam to be used for receiving the PDSCH.

In some aspects, when a single default PDSCH beam is to be used for receiving the PDSCH, the default PDSCH beam to be used for receiving the PDSCH is to switch between the first default PDSCH beam, associated with the set of source cells, and the second default PDSCH beam, associated with the set of target cells, at a particular interval.

In some aspects, when multiple default PDSCH beams are to be used for receiving the PDSCH, both the first default PDSCH beam, associated with the set of source cells, and the second default PDSCH beam, associated with the set of source cells, are identified for receiving the PDSCH.

In some aspects, the default PDSCH beam is identified based at least in part on a default PDSCH beam pattern configured on the UE.

In some aspects, a method of wireless communication, performed by a user equipment (UE), may include determining that the UE is scheduled to concurrently receive multiple downlink communications from a set of source cells and a set of target cells, wherein the multiple downlink communications include one or more downlink channels or one or more downlink reference signals, and wherein the UE is connected to both the set of source cells and the set of target cells during a handover from the set of source cells to the set of target cells; determining at least one downlink communication, of the multiple downlink communications, to be received by the UE; and receiving the at least one downlink communication.

In some aspects, the set of source cells is in a set of source secondary cell groups (SCGs) and the set of target cells is in a set of target SCGs.

In some aspects, downlink communications from the set of source cells and the set of target cells are associated with different quasi co-location relations for downlink beam determination.

In some aspects, the at least one downlink communication is determined according to a prioritization rule that prioritizes downlink communications based at least in part on downlink communication type.

In some aspects, the downlink communication type includes at least one of: a physical downlink control channel (PDCCH), a physical downlink shared channel (PDSCH), a channel state information reference signal (CSI-RS) with repetition ON, a CSI-RS with repetition OFF, a CSI-RS for a CSI report, a periodic CSI-RS, a semi-persistent CSI-RS, an aperiodic CSI-RS, or a synchronization signal block (SSB).

In some aspects, the at least one downlink communication is determined according to a prioritization rule that prioritizes downlink communications based at least in part on cell attributes. In some aspects, the cell attributes include at least one of: a designation as a source or target cell, and a cell identifier.

In some aspects, the set of source cells and the set of target cells are associated with a same quasi co-location relation for the UE to receive each of the multiple downlink communications.

In some aspects, a method of wireless communication, performed by a user equipment (UE), may include determining that the UE is scheduled to concurrently transmit multiple uplink communications to a set of source cells and a set of target cells, wherein the multiple uplink communications include one or more uplink channels or one or more uplink reference signals, and wherein the UE is connected to both the set of source cells and the set of target cells during a handover from the set of source cells to the set of target cells; determining at least one uplink communication, of the multiple uplink communications, to be transmitted by the UE; and transmitting the determined at least one uplink communication.

In some aspects, the set of source cells is in a set of source secondary cell groups (SCGs) and the set of target cells is in a set of target SCGs.

In some aspects, the set of source cells and the set of target cells are associated with different spatial relations for uplink beam determination.

In some aspects, the at least one uplink communication is determined according to a prioritization rule that prioritizes uplink communications based at least in part on uplink communication type. In some aspects, the uplink communication type includes at least one of: a physical uplink control channel (PUCCH), a physical uplink shared channel (PUSCH), or a sounding reference signal (SRS).

In some aspects, the at least one uplink communication is determined according to a prioritization rule that prioritizes uplink communications based at least in part on cell attributes. In some aspects, the cell attributes include at least one of: a designation as a source or target cell, and a cell identifier.

In some aspects, the set of source cells and the set of target cells are associated with a same spatial relation for the UE to transmit each of the multiple uplink communications.

In some aspects, a UE for wireless communication may include memory and one or more processors operatively coupled to the memory. The memory and the one or more processors may be configured to connect to a set of source cell groups (CGs); receive a target cell group setup information, the target cell group setup information is associated with a set of target CGs; connect to the set of target CGs based at least in part on the target cell group setup information during a handover from the set of source CGs to the set of target CGs; and disconnect from the set of source CGs after connecting to the set of target CGs.

In some aspects, a UE for wireless communication may include memory and one or more processors operatively coupled to the memory. The memory and the one or more processors may be configured to determine that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells; select, based at least in part on a prioritization rule, either the first CORESET or the second CORESET as a CORESET in which to monitor PDCCH candidates; and monitor PDCCH candidates in the overlapping PDCCH monitoring occasions in the selected CORESET.

In some aspects, a UE for wireless communication may include memory and one or more processors operatively coupled to the memory. The memory and the one or more processors may be configured to determine that the UE is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the UE is connected to both a set of source cells and a set of target cells during a handover from the set of source cells to the set of target cells, and wherein the set of source cells is associated with a first default PDSCH beam and the set of target cells is associated with a second default PDSCH beam; identify the first default PDSCH beam or the second default PDSCH beam as a default PDSCH beam to be used for receiving the PDSCH; and receive the PDSCH using the identified default PDSCH beam.

In some aspects, a UE for wireless communication may include memory and one or more processors operatively coupled to the memory. The memory and the one or more processors may be configured to determine that the UE is scheduled to concurrently receive multiple downlink communications from a set of source cells and a set of target cells, wherein the multiple downlink communications include one or more downlink channels or one or more downlink reference signals, and wherein the UE is connected to both the set of source cells and the set of target cells during a handover from the set of source cells to the set of target cells; determine at least one downlink communication, of the multiple downlink communications, to be received by the UE; and receive the at least one downlink communication.

In some aspects, a UE for wireless communication may include memory and one or more processors operatively coupled to the memory. The memory and the one or more processors may be configured to determine that the UE is scheduled to concurrently transmit multiple uplink communications to a set of source cells and a set of target cells, wherein the multiple uplink communications include one or more uplink channels or one or more uplink reference signals, and wherein the UE is connected to both the set of source cells and the set of target cells during a handover from the set of source cells to the set of target cells; determine at least one uplink communication, of the multiple uplink communications, to be transmitted by the UE; and transmit the determined at least one uplink communication.

In some aspects, a non-transitory computer-readable medium may store one or more instructions for wireless communication. The one or more instructions, when executed by one or more processors of a UE, may cause the one or more processors to: connect to a set of source cell groups (CGs); receive a target cell group setup information, the target cell group setup information is associated with a set of target CGs; connect to the set of target CGs based at least in part on the target cell group setup information during a handover from the set of source CGs to the set of target CGs; and disconnect from the set of source CGs after connecting to the set of target CGs.

In some aspects, a non-transitory computer-readable medium may store one or more instructions for wireless communication. The one or more instructions, when executed by one or more processors of a UE, may cause the one or more processors to: determine that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells; select, based at least in part on a prioritization rule, either the first CORESET or the second CORESET as a CORESET in which to monitor PDCCH candidates; and monitor PDCCH candidates in the overlapping PDCCH monitoring occasions in the selected CORESET.

In some aspects, a non-transitory computer-readable medium may store one or more instructions for wireless communication. The one or more instructions, when executed by one or more processors of a UE, may cause the one or more processors to: determine that the UE is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the UE is connected to both a set of source cells and a set of target cells during a handover from the set of source cells to the set of target cells, and wherein the set of source cells is associated with a first default PDSCH beam and the set of target cells is associated with a second default PDSCH beam; identify the first default PDSCH beam or the second default PDSCH beam as a default PDSCH beam to be used for receiving the PDSCH; and receive the PDSCH using the identified default PDSCH beam.

In some aspects, a non-transitory computer-readable medium may store one or more instructions for wireless communication. The one or more instructions, when executed by one or more processors of a UE, may cause the one or more processors to: determine that the UE is scheduled to concurrently receive multiple downlink communications from a set of source cells and a set of target cells, wherein the multiple downlink communications include one or more downlink channels or one or more downlink reference signals, and wherein the UE is connected to both the set of source cells and the set of target cells during a handover from the set of source cells to the set of target cells; determine at least one downlink communication, of the multiple downlink communications, to be received by the UE; and receive the at least one downlink communication.

In some aspects, a non-transitory computer-readable medium may store one or more instructions for wireless communication. The one or more instructions, when executed by one or more processors of a UE, may cause the one or more processors to: determine that the UE is scheduled to concurrently transmit multiple uplink communications to a set of source cells and a set of target cells, wherein the multiple uplink communications include one or more uplink channels or one or more uplink reference signals, and wherein the UE is connected to both the set of source cells and the set of target cells during a handover from the set of source cells to the set of target cells; determine at least one uplink communication, of the multiple uplink communications, to be transmitted by the UE; and transmit the determined at least one uplink communication.

In some aspects, an apparatus for wireless communication may include means for connecting to a set of source cell groups (CGs); means for receiving a target cell group setup information, the target cell group setup information is associated with a set of target CGs; means for connecting to the set of target CGs based at least in part on the target cell group setup information during a handover from the set of source CGs to the set of target CGs; and means for disconnecting from the set of source CGs after connecting to the set of target CGs.

In some aspects, an apparatus for wireless communication may include means for determining that the apparatus is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the apparatus is connected to both the set of source cells and the set of target cells during a handover from the set of source cells to the set of target cells; means for selecting, based at least in part on a prioritization rule, either the first CORESET or the second CORESET as a CORESET in which to monitor PDCCH candidates; and means for monitoring PDCCH candidates in the overlapping PDCCH monitoring occasions in the selected CORESET.

In some aspects, an apparatus for wireless communication may include means for determining that the apparatus is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the apparatus is connected to both a set of source cells and a set of target cells during a handover from the set of source cells to the set of target cells, and wherein the set of source cells is associated with a first default PDSCH beam and the set of target cells is associated with a second default PDSCH beam; means for identifying the first default PDSCH beam or the second default PDSCH beam as a default PDSCH beam to be used for receiving the PDSCH; and means for receiving the PDSCH using the identified default PDSCH beam.

In some aspects, an apparatus for wireless communication may include means for determining that the apparatus is scheduled to concurrently receive multiple downlink communications from a set of source cells and a set of target cells, wherein the multiple downlink communications include one or more downlink channels or one or more downlink reference signals, and wherein the apparatus is connected to both the set of source cells and the set of target cells during a handover from the set of source cells to the set of target cells; means for determining at least one downlink communication, of the multiple downlink communications, to be received by the apparatus; and means for receiving the at least one downlink communication.

In some aspects, an apparatus for wireless communication may include means for determining that the apparatus is scheduled to concurrently transmit multiple uplink communications to a set of source cells and a set of target cells, wherein the multiple uplink communications include one or more uplink channels or one or more uplink reference signals, and wherein the apparatus is connected to both the set of source cells and the set of target cells during a handover from the set of source cells to the set of target cells; means for determining at least one uplink communication, of the multiple uplink communications, to be transmitted by the apparatus; and means for transmitting the determined at least one uplink communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
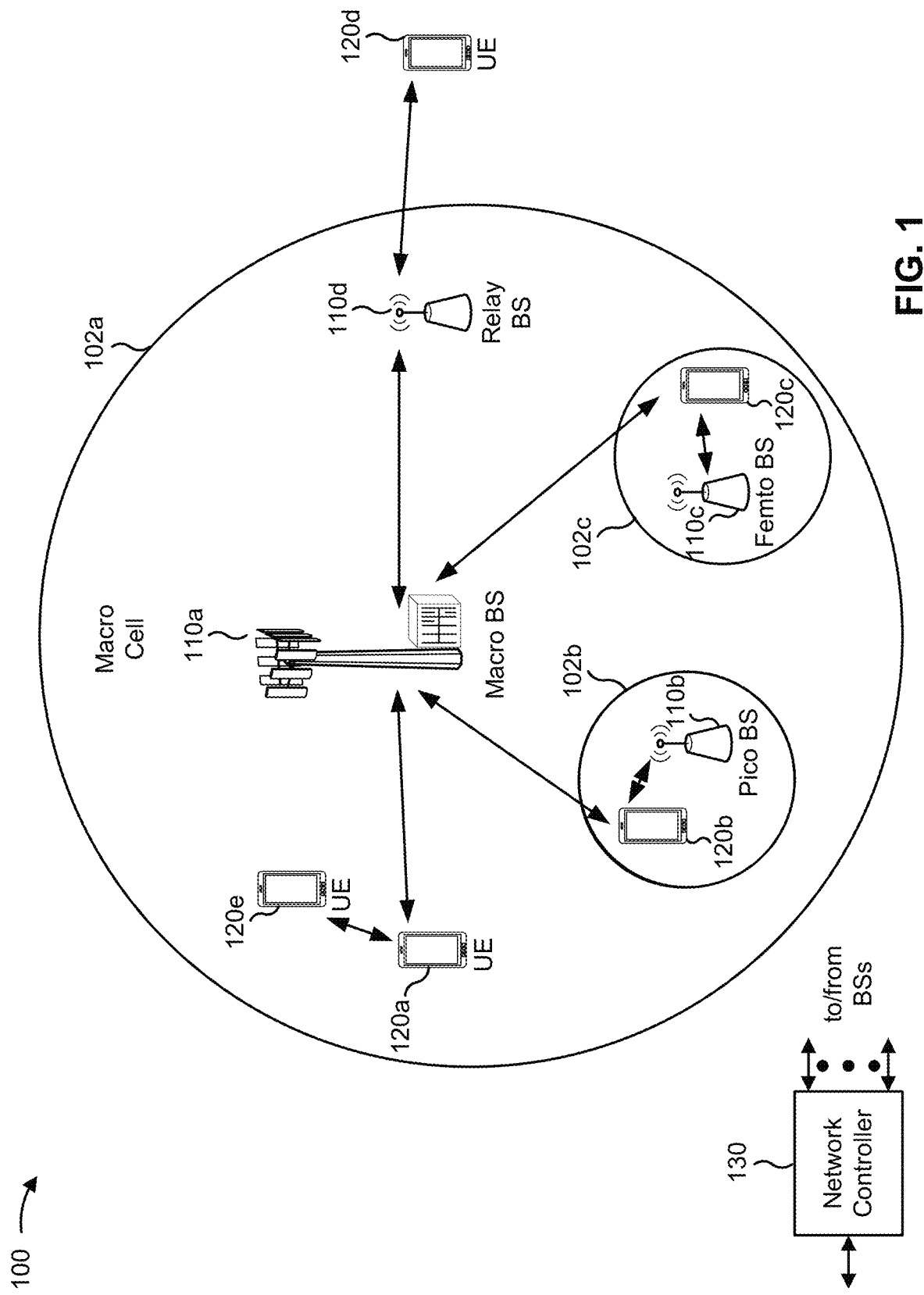
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
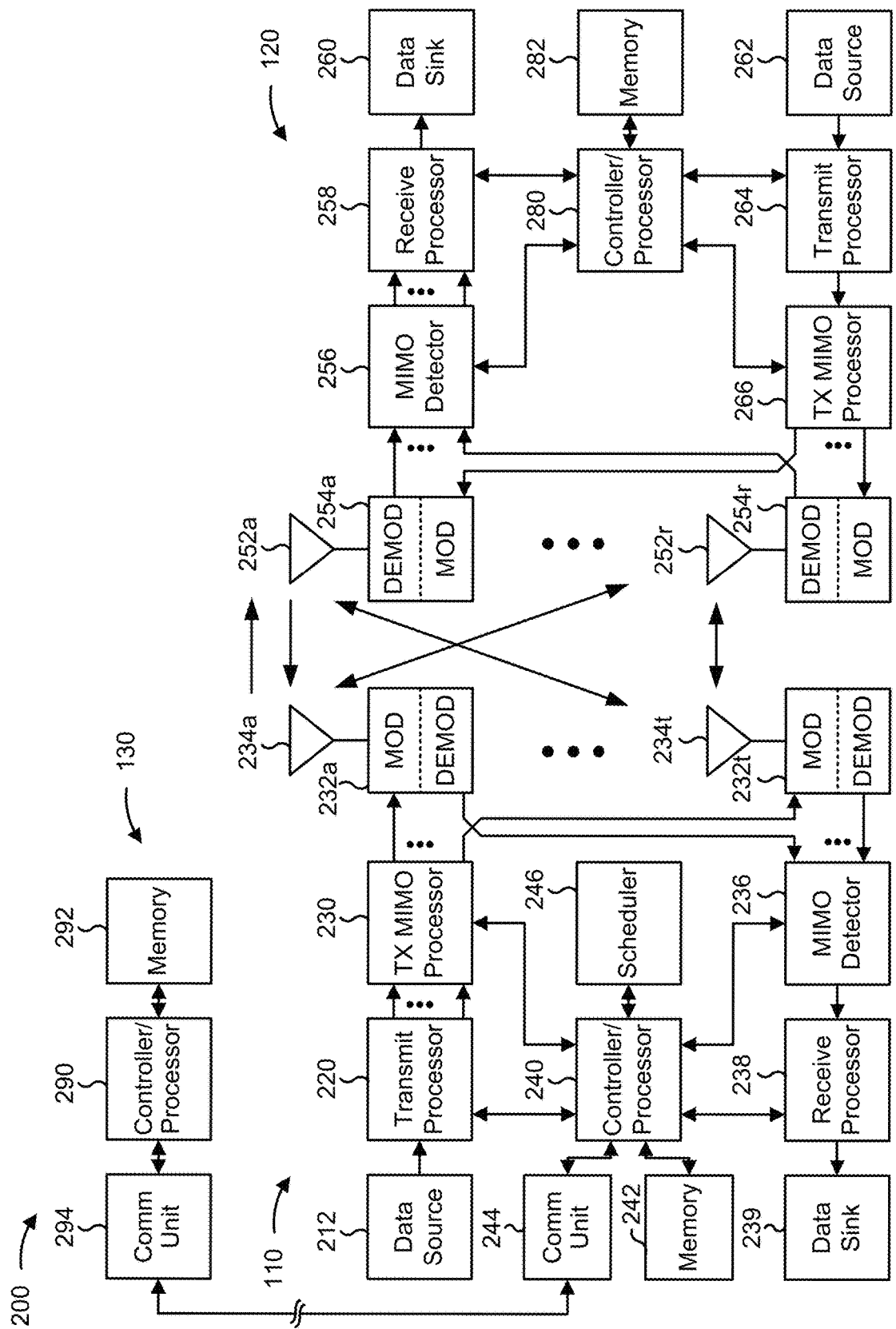
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with prioritization associated with a cell group (CG) change, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, process 600 of FIG. 6, process 700 of FIG. 7, process 800 of FIG. 8, and/or other processes as described herein. A scheduler 246 may schedule UEs for data transmission on the downlink and/or uplink.

In some aspects, UE 120 may include means for connecting to a set of source cell groups (CGs); means for receiving a target cell group setup information, the target cell group setup information being associated with a set of target CGs; means for connecting to the set of target CGs, based at least in part on the target cell group setup information, during a handover from the set of source CGs to the set of target CGs; means for disconnecting from the set of source CGs after connecting to the set of target CGs; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells; means for selecting, based at least in part on a prioritization rule, either the first CORESET or the second CORESET as a CORESET in which to monitor PDCCH candidates; means for monitoring PDCCH candidates in the overlapping PDCCH monitoring occasions in the selected CORESET; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that the UE is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the UE is connected to both a set of source cells and a set of target cells during a handover from the set of source cells to the set of target cells, and wherein the set of source cells is associated with a first default PDSCH beam and the set of target cells is associated with a second default PDSCH beam; means for identifying the first default PDSCH beam or the second default PDSCH beam as a default PDSCH beam to be used for receiving the PDSCH; means for receiving the PDSCH using the identified default PDSCH beam; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that the UE is scheduled to concurrently receive multiple downlink communications from a set of source cells and a set of target cells, wherein the multiple downlink communications include one or more downlink channels or one or more downlink reference signals, and wherein the UE is connected to both the set of source cells and the set of target cells during a handover from the set of source cells to the set of target cells; means for determining at least one downlink communication, of the multiple downlink communications, to be received by the UE; means for receiving the at least one downlink communication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that the UE is scheduled to concurrently transmit multiple uplink communications to a set of source cells and a set of target cells, wherein the multiple uplink communications include one or more uplink channels or one or more uplink reference signals, and wherein the UE is connected to both the set of source cells and the set of target cells during a handover from the set of source cells to the set of target cells; means for determining at least one uplink communication, of the multiple uplink communications, to be transmitted by the UE; means for transmitting the determined at least one uplink communication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Some wireless communication systems permit dual connectivity of a user equipment (UE) (e.g., UE 120) to a network. For example, with dual connectivity, the UE may connect to the network via a master cell group (MCG), which may include one or more serving cells associated with a master node (MN), and a secondary cell group (SCG), which may include one or more serving cells associated with a secondary node (SN). Each SCG may include a primary secondary cell (PSCell) and one or more secondary cells (SCells). Dual connectivity via the MCG and the SCG (each of which may be controlled by a different base station 110) may enable improved connectivity, coverage area, and bandwidth for the UE.

However, in dual connectivity, when the UE moves throughout the network, a CG (e.g., the MCG and/or the SCG) to which the UE is connected may need to change. For example, when the CG is associated with a high frequency bandwidth (e.g., Frequency Range 2 (FR2)), coverage of a given CG may be limited, such that the UE needs to change from a source CG to a target CG. Put another way, in some cases mobility of the UE may necessitate a handover from the source CG to the target CG. The source CG and the target CG may be managed by different distributed units (DUs) associated with a given base station (e.g., base station 110), which may be under the same central unit (CU) of the base station.

The change of CG is based on the so-called "break before make," concept, meaning that the connection with the source CG must be released before a connection with the target CG can be established. However, requiring the connection with the source CG to be released before the connection with the target CG can be established causes traffic interruption at the UE, because the UE cannot send or receive traffic on any CG during a period of time between disconnecting from the source CG and connecting to the target CG.

Some aspects described herein provide techniques and apparatuses that enable a UE to maintain a connection with one or more source CGs during a handover from a source CG to a target CG. In this way, traffic interruption during an CG change is prevented.

However, allowing the UE to concurrently maintain the connection to the one or more source CGs and the connection to the one or more target CGs introduces ambiguity at the UE with regard to a number of issues while the UE is connected to both the one or more source CGs and the one or more target CGs. Such issues include identification of a control resource set (CORESET) in which physical downlink control channel (PDCCH) candidates are to be monitored (in the case of overlapping PDCCH monitoring occasions), identification of a default physical downlink shared channel (PDSCH) beam to be used for receiving a PDSCH when a scheduling offset between a scheduling PDCCH and the PDSCH is less than a beam switch latency threshold, identifying one or more downlink communications to receive when multiple downlink communications are to be simultaneously received by the UE on the source and target CGs, and identifying one or more uplink communications to transmit when multiple uplink communications are to be simultaneously transmitted by the UE on the source and target CGs. Some aspects described herein provide techniques and apparatuses for resolving these issues, as described in further detail below.

Figure 3:
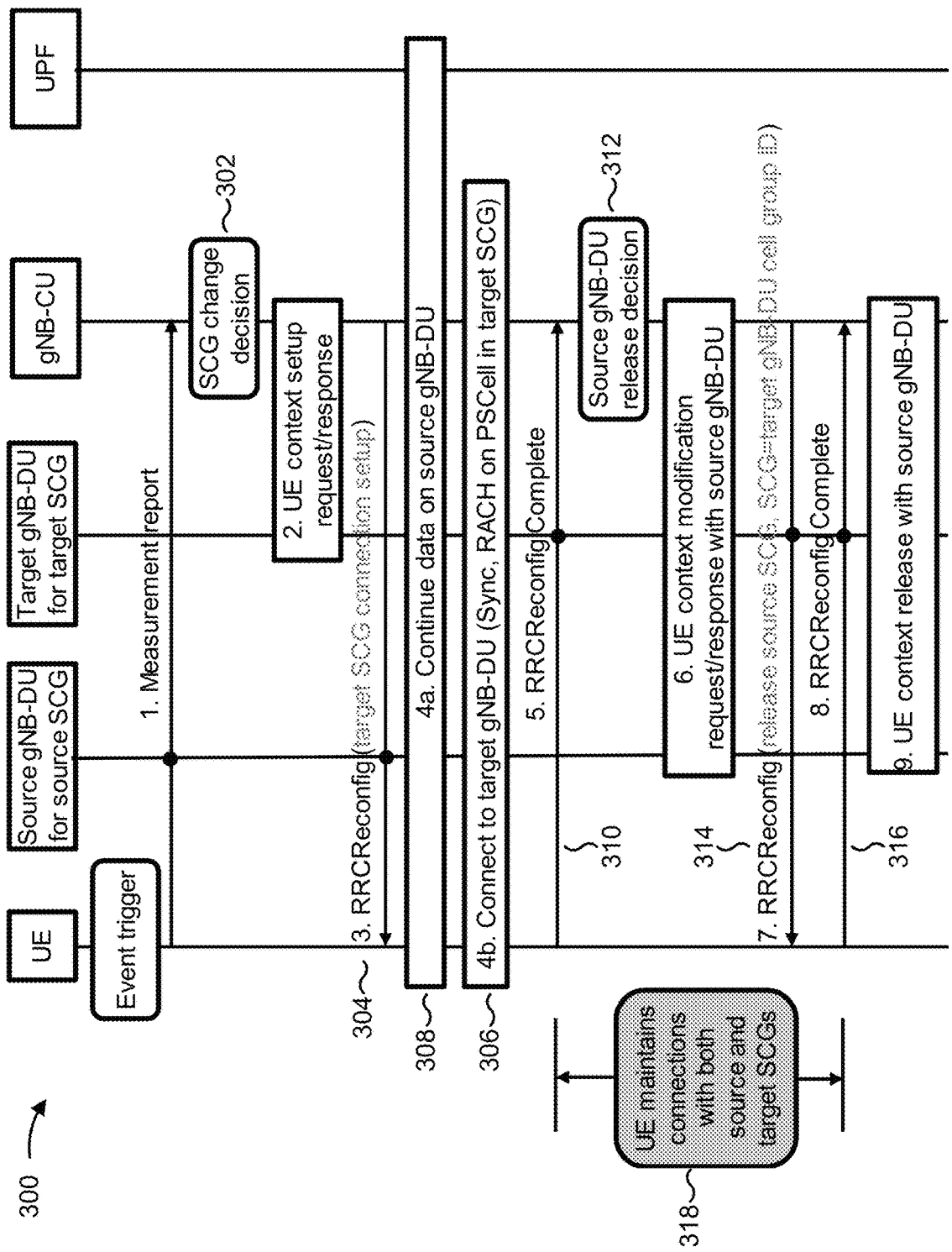
FIG. 3 is a diagram illustrating an example of prioritization associated with an SCG change, in accordance with various aspects of the present disclosure.

FIG. 3 is a diagram illustrating an example 300 of prioritization associated with an CG change, in accordance with various aspects of the present disclosure. In FIG. 3, a UE (e.g., UE 120) is connected to a source SCG (e.g., as part of dual connectivity provided by an MCG and the source SCG). As shown, the source SCG may be associated with a first DU of a base station (e.g., base station 110). Notably, while FIG. 3 is described in the context of an SCG change (i.e., a handover from a source SCG to a target SCG), similar techniques may be applied in the case of an MCG change (i.e., a handover from a source MCG to a target MCG).

As shown by reference 302 in FIG. 3, a CU of the base station may determine that the UE is to change from the source SCG to a target SCG. In other words, the CU may determine that the UE is to be handed over from one or more source cells in the source SCG to one or more target cells in the target SCG. As shown, the target SCG may be associated with a second DU of the base station. In some aspects, as indicated in FIG. 3, the CU may determine that the UE is to change from the source SCG to the target SCG based at least in part on a measurement report, associated with the source SCG and/or the target SCG, that is provided by the UE.

As shown by reference 304, in association with the handover, the CU may provide target cell group setup information, and the UE may receive the target cell group setup information. In some aspects, the target cell group setup information may be associated with a target SCG to which the UE is to connect, such as a cell group identifier associated with the target SCG and/or another type of information. In some aspects, the CU may transmit, and the UE may receive, the target cell group setup information in a target cell group setup information element (IE) included in a radio resource control (RRC) reconfiguration message, as shown in FIG. 3. In some aspects, the target cell group setup information may include a target cell group identifier, a primary cell identifier, a set of secondary cell identifiers, and/or a configuration per cell.

As shown by reference 306, the UE may connect to the target SCG based at least in part on the target cell group setup information. As indicated by reference 308, the UE may continue to send and/or receive data via the source SCG while the UE connects to the target SCG.

As shown by reference 310, the UE may provide an RRC reconfiguration complete message to the CU based at least in part on connecting to the target SCG. As shown by reference 312, based at least in part on receiving the RRC reconfiguration complete message, the CU may decide that the UE is to release the connection with the source SCG.

As shown by reference 314, the CU may provide, and the UE may receive, an RRC reconfiguration message indicating that the UE is to disconnect from the source SCG (i.e., an indication that the UE is to release the source SCG). The UE may receive the RRC reconfiguration message and disconnect from the source SCG accordingly. In some aspects, the disconnecting from the set of source SCGs is triggered based at least in part on an SCG switching indication received in the RRC reconfiguration message. In some aspects, the SCG switching indication includes a cell group identifier associated with the set of target SCGs.

As shown by reference 316, the UE may, after disconnecting from the source SCG, provide an RRC reconfiguration complete message indicating that the UE has disconnected from the source SCG, thereby completing the handover from the source SCG to the target SCG.

Notably, the example described by FIG. 3 is described in the context of a single source SCG and a single target SCG. However, in some aspects, a capability of the UE may enable the UE to be connected to multiple SCGs at a given time. In such a case, the UE may be handed over from multiple source SCGs to multiple target SCGs. The techniques and apparatuses described in association with FIG. 3 can be applied regardless of the number of target SCGs. For example, the target cell group setup information may include information associated with a set of target SCGs (i.e., one or more target SCGs). Here, the UE may connect to each of the target SCGs in the manner described above, and disconnect from each of a set of source SCGs accordingly. In some aspects, a number of target cell SCGs in the set of SCGs is based at least in part on a UE capability signaled by the UE to the base station.

In some aspects, as indicated by reference 318, the UE maintains a connection with the source SCG and a connection with the target SCG from a time of the connecting to the target SCG until a time of the disconnecting from the source SCG. During this period of time the UE is connected to both the source SCG and the target SCG. However, allowing the UE to concurrently maintain the connection to the source SCG and the connection to the target SCG introduces ambiguity at the UE with regard to a number of issues.

One such issue is associated with identification of a CORESET in which PDCCH candidates are to be monitored (in the case of overlapping PDCCH monitoring occasions).

In some aspects, during the time period in which the UE is connected to a source CG and the target CG during the handover, the UE may determine that the UE is to monitor physical PDCCH candidates in overlapping PDCCH monitoring occasions on the source cell and the target cell. In some aspects, the source cell may be in a source SCGs and the target cell may be included in a target SCG. Here, the source cell may be associated with a first CORESET and the target cell may be associated with a second CORESET that is different from the first CORESET. In some aspects, the UE may select, based at least in part on a prioritization rule, either the first CORESET or the second CORESET as a CORESET in which to monitor PDCCH candidates. In some aspects, after selecting the first CORESET or the second CORESET, the UE may monitor PDCCH candidates in the overlapping PDCCH monitoring occasions in the selected CORESET. In some aspects, the UE may monitor PDCCH candidates in the overlapping PDCCH monitoring occasions in another CORESET when quasi co-location (QCL) TypeD properties of the other CORESET match QCL TypeD properties of the selected CORESET. In some aspects, the first CORESET and the second CORESET may have the same QCL TypeD properties, or may have different QCL TypeD properties.

In some aspects, the prioritization rule may be based at least in part on search space types associated with the first CORESET and the second CORESET. For example, the prioritization rule may prioritize CORESETs configured for common search spaces over CORESETs configured for UE-specific search spaces. As another example, the prioritization rule may prioritize CORESETs configured for UE-specific search spaces over CORESETs configured for common search spaces.

In some aspects, the prioritization rule may be based at least in part on cell identifiers associated with the source cell and cell identifiers associated with the target cells. For example, the prioritization rule may prioritize CORESETs configured for cells with lower cell identifiers over CORESETs configured for cells with higher cell identifiers. As another example, the prioritization rule may prioritize CORESETs configured for cells with higher cell identifiers over CORESETs configured for cells with lower cell identifiers.

In some aspects, the prioritization rule may be based at least in part on search space identifiers associated with the first CORESET and the second CORESET. For example, the prioritization rule may prioritize CORESETs configured for search spaces with lower search space identifiers over CORESETs configured for search spaces with higher search space identifiers. As another example, the prioritization rule may prioritize CORESETs configured for search spaces with higher search space identifiers over CORESETs configured for search spaces with lower search space identifiers.

In some aspects, the prioritization rule may be based at least in part on cell types of the source cell and the target cell. For example, the prioritization rule may prioritize CORESETs configured for target cells over CORESETs configured for source cells. As another example, the prioritization rule may prioritize CORESETs configured for source cells over CORESETs configured for target cells.

Another issue associated with allowing the UE to concurrently maintain the connection to the source cell and the connection to the target cell is associated with identification of a default PDSCH beam to be used for receiving a PDSCH when a scheduling offset between a scheduling PDCCH and the PDSCH is less than a beam switch latency threshold. In some aspects, during the time period in which the UE is connected to the source cell and the target cell during the handover, the UE may determine that the UE is to receive a PDSCH using a default PDSCH beam. Here, when a scheduling offset, associated with receiving the PDSCH, is less than a beam switch latency threshold associated with identifying a beam to be used for receiving the PDSCH, the UE may need to use a default PDSCH beam for receiving the PDSCH. However, the source cell may be associated with a first default PDSCH beam and the target cell may be associated with a second default PDSCH beam. In some aspects, the UE may identify the first default PDSCH beam or the second default PDSCH beam as the default PDSCH beam to be used for receiving the PDSCH, and may receive the PDSCH using the identified default PDSCH beam.

In some aspects, when a single default PDSCH beam is to be used for receiving the PDSCH, the UE may be configured to identify the second default PDSCH beam, associated with the target cell, as the default PDSCH beam to be used for receiving the PDSCH. For example, the UE may be configured such that the default PDSCH beam follows a QCL of a CORESET with a lowest identifier in a latest monitored slot on a target cell. Alternatively, in some aspects when a single default PDSCH beam is to be used for receiving the PDSCH, the UE may be configured to identify the first default PDSCH beam, associated with the source cell, as the default PDSCH beam to be used for receiving the PDSCH. For example, the UE may be configured such that the default PDSCH beam follows a QCL of a CORESET with a lowest identifier in a latest monitored slot on a source cell.

In some aspects, when a single default PDSCH beam is to be used for receiving the PDSCH, the UE may be configured such that the default PDSCH beam to be used for receiving the PDSCH switches between the first default PDSCH beam, associated with the cell, and the second default PDSCH beam, associated with the target cell, at a particular interval. For example, the UE may be configured such that, in odd numbered slots, the default PDSCH beam follows a QCL of a CORESET with a lowest identifier in a latest monitored slot on the source cell, while in even slots, the default PDSCH beam follows a QCL of a CORESET with a lowest identifier in a latest monitored slot on the target cell.

In some aspects, when multiple default PDSCH beams are to be used for receiving the PDSCH, the UE may be configured to identify both the first default PDSCH beam and the second default PDSCH beam for receiving the PDSCH. For example, the UE may be configured such that a first default PDSCH beam may follow a QCL of a CORESET with a lowest identifier in a latest monitored slot on the source cell, while a second default PDSCH beam may follow a QCL of CORESET with a lowest identifier in a latest monitored slot on the target cell. Here, the UE may use both the first and second default PDSCH beams to receive simultaneously.

In some aspects, the UE may be configured to identify the default PDSCH beam based at least in part on a default PDSCH beam pattern configured on the UE. For example, a default PDSCH beam(s) to be used on each time/frequency resource may be pre-configured on the UE (e.g., two default beams determined by a first transmission configuration information (TCI) state and a second TCI state may be used alternatively on different slots or used simultaneously)

Another issue associated with allowing the UE to concurrently maintain the connection to the source cell and the connection to the target cell is associated with identification of one or more downlink communications to receive when multiple downlink communications are to be simultaneously received by the UE on the source and target cells. In some aspects, during the time period in which the UE is connected to the source cell and the target cell during the handover, the UE may determine that the UE is scheduled to concurrently receive multiple downlink communications from the source cell and the target cell. In some aspects, the multiple downlink communications may include one or more downlink channels (e.g., PDCCH, PDSCH, and/or the like) and/or one or more downlink reference signals (RS) (e.g., channel state information (CSI)-RS with repetition ON or OFF, a CSI-RS for a CSI report, a periodic CSI-RS, a semi-persistent CSI-RS, an aperiodic CSI-RS, a synchronization signal block (SSB), and/or the like). In some aspects, the UE may determine at least one downlink communication, of the multiple downlink communications, to be received by the UE, and may receive the at least one downlink communication. In some aspects, the downlink communications from the source cell and the target cell may be associated with different QCL relations for downlink beam determination.

In some aspects, the UE may determine the at least one downlink communication according to a prioritization rule that prioritizes downlink communications based at least in part on downlink communication type. For example, for at least some combinations of simultaneously received downlink communications, the prioritization rule may be explicitly configured such that one type of downlink communication has higher priority than another type of downlink communication.

In some aspects, the UE may determine the at least one downlink communication according to a prioritization rule that prioritizes downlink communications based at least in part on cell attributes. For example, for at least some combinations of simultaneously received downlink communications, the prioritization rule may be explicitly configured such that a downlink communication from one cell (e.g., a target cell) has higher priority than a downlink communication from another cell (e.g., a source cell). In some aspects, the cell attributes may include a designation as a source or target cell, a cell identifier, and/or the like.

In some aspects, if the source cell and the target cell are associated with a same QCL relation for the UE to receive each of the multiple downlink communications. For example, for at least some combinations of simultaneously received downlink communications, the base station may ensure that the same QCL is applied, thereby enabling the UE to receive each of the multiple downlink communications.

Another issue associated with allowing the UE to concurrently maintain the connection to the source cell and the connection to the target cell is associated with identification of one or more uplink communications to transmit when multiple uplink communications are to be simultaneously transmitted by the UE on the source and target cells. In some aspects, during the time period in which the UE is connected to the source cell and the target cell during the handover, the UE may determine that the UE is scheduled to concurrently transmit multiple uplink communications to the source cell and the target cell. In some aspects, the multiple uplink communications may include one or more uplink channels (e.g., physical uplink control channel (PUCCH), physical uplink shared channel (PDSCH), and/or the like) and/or one or more uplink RSs (e.g., a sounding reference signal (SRS) and/or the like). In some aspects, the UE may determine at least one uplink communication, of the multiple uplink communications, to be transmitted by the UE, and may transmit the at least one uplink communication. In some aspects, the source cell and the target cell may be associated with different spatial relations for uplink beam determination.

In some aspects, the UE may determine the at least one uplink communication according to a prioritization rule that prioritizes uplink communications based at least in part on uplink communication type. For example, for at least some combinations of simultaneously transmitted uplink communications, the prioritization rule may be explicitly configured such that one type of uplink communication has higher priority than another type of uplink communication.

In some aspects, the UE may determine the at least one uplink communication according to a prioritization rule that prioritizes uplink communications based at least in part on cell attributes. For example, for at least some combinations of simultaneously transmitted uplink communications, the prioritization rule may be explicitly configured such that an uplink communication to be transmitted to one cell (e.g., a target cell) has higher priority than an uplink communication to be transmitted to another cell (e.g., a source cell). In some aspects, the cell attributes include a designation as a source or target cell, a cell identifier, and/or the like.

In some aspects, the source cell and the target cell may be associated with a same spatial relation for the UE to transmit each of the multiple uplink communications. For example, for at least some combinations of simultaneously transmitted uplink communications, the base station may ensure that the same spatial relationship is applied, thereby enabling the UE to transmit each of the multiple uplink communications.

As indicated above, FIG. 3 is provided as an example. Other examples may differ from what is described with respect to FIG. 3.

Figure 4:
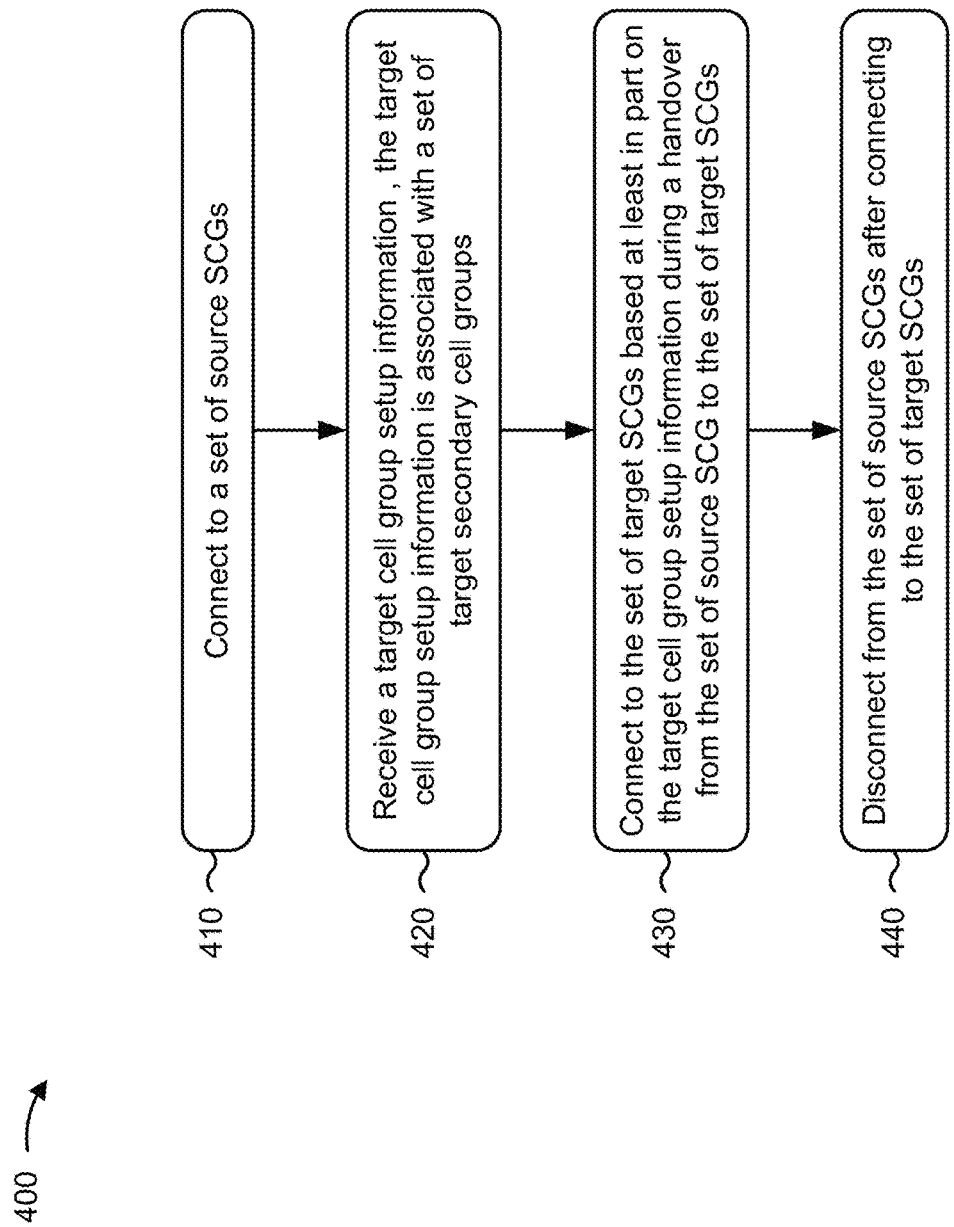
FIGS. 4-8 are diagrams illustrating example processes performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations related to prioritization associated with a CG change.

As shown in FIG. 4, in some aspects, process 400 may include connecting to a set of source cell groups (CGs) (block 410). For example, the UE (e.g., using receive processor 258, transmit processor 264, controller/processor 280, memory 282, and/or the like) may connect to a set of source cell groups (CGs), as described above.

As further shown in FIG. 4, in some aspects, process 400 may include receiving a target cell group setup information, the target cell group setup information is associated with a set of target CGs (block 420). For example, the UE (e.g., using receive processor 258, transmit processor 264, controller/processor 280, memory 282, and/or the like) may receive a target cell group setup information, the target cell group setup information is associated with a set of target CGs, as described above.

As further shown in FIG. 4, in some aspects, process 400 may include connecting to the set of target CGs based at least in part on the target cell group setup information during a handover from the set of source CGs to the set of target CGs (block 430). For example, the user equipment (UE) (e.g., using receive processor 258, transmit processor 264, controller/processor 280, memory 282, and/or the like) may connect to the set of target CGs based at least in part on the target cell group setup information during a handover from the set of source CGs to the set of target CGs, as described above.

As further shown in FIG. 4, in some aspects, process 400 may include disconnecting from the set of source CGs after connecting to the set of target CGs (block 440). For example, the user equipment (UE) (e.g., using receive processor 258, transmit processor 264, controller/processor 280, memory 282, and/or the like) may disconnect from the set of source CGs after connecting to the set of target CGs, as described above.

Process 400 may include additional aspects, such as any single aspect or any combination of aspects described below and/or in connection with one or more other processes described elsewhere herein.

In a first aspect, the set of source CGs and the set of target CGs include a set of source secondary CGs and a set of target secondary CGs, respectively.

In a second aspect, alone or in combination with the first aspect, the set of source CGs and the set of target CGs include a set of source master CGs and a set of target master CGs, respectively.

In a third aspect, alone or in combination with one or more of the first and second aspects, the target cell group setup information includes at least one of.

In a fourth aspect, alone or in combination with one or more of the first through third aspects, the UE maintains a connection with the set of source CGs and a connection with the set of target CGs from a time of the connecting to the set of target CGs until a time of the disconnecting from the set of source CGs.

In a fifth aspect, alone or in combination with one or more of the first through fourth aspects, the target cell group setup information is received in a target cell group setup information element included in a radio resource control reconfiguration message.

In a sixth aspect, alone or in combination with one or more of the first through fifth aspects, a number of target cell CGs in the set of CGs is based at least in part on a UE capability signaled by the UE.

In a seventh aspect, alone or in combination with one or more of the first through sixth aspects, the disconnect from the set of source CGs is triggered based at least in part on an CG switching indication received in a radio resource control (RRC) reconfiguration message.

In an eighth aspect, alone or in combination with one or more of the first through seventh aspects, the CG switching indication includes a cell group identifier associated with the set of target CGs.

In a ninth aspect, alone or in combination with one or more of the first through eighth aspects, the RRC reconfiguration message further includes an indication to release the set of source CGs.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
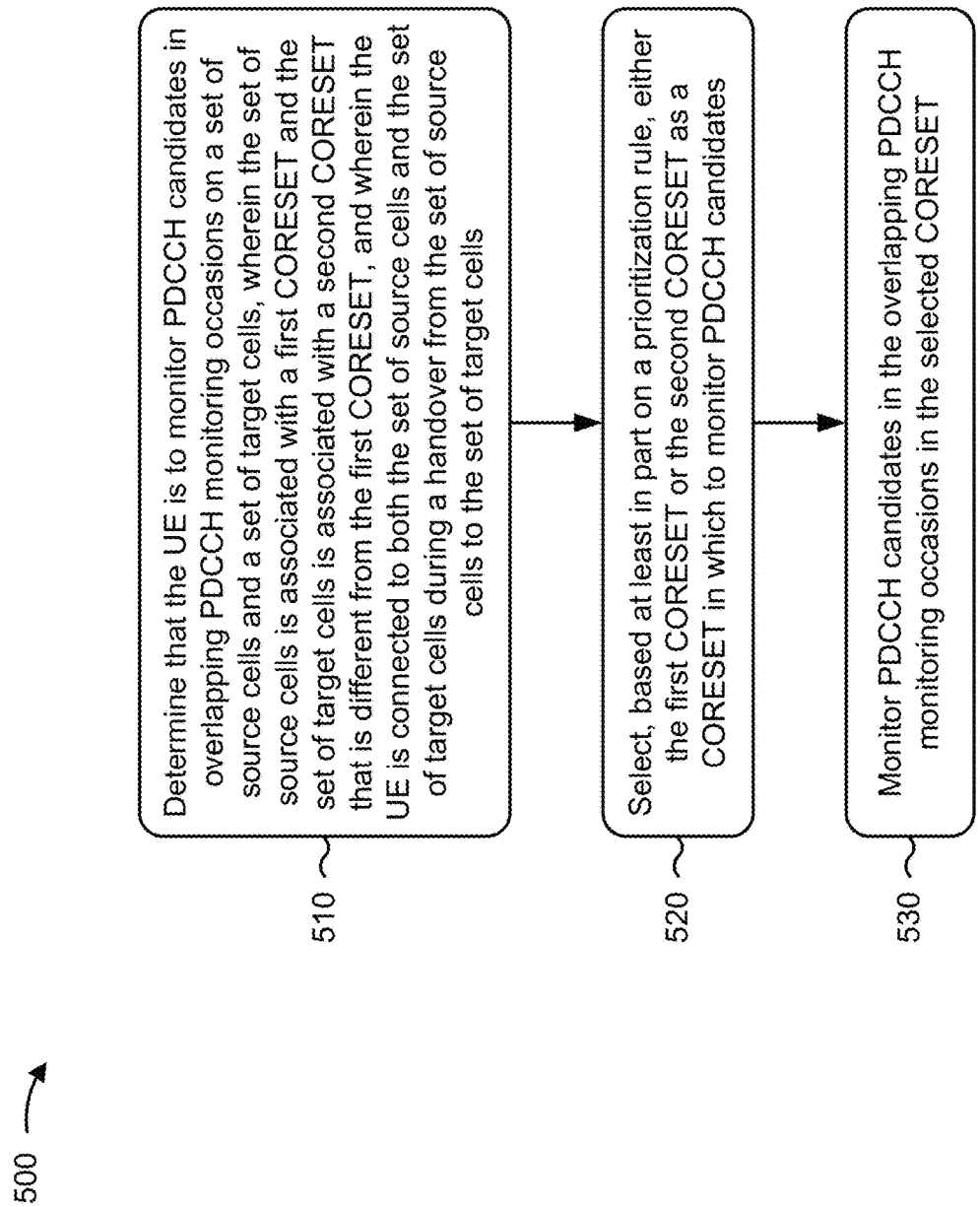

FIG. 5 is a diagram illustrating an example process 500 performed, for example, by a UE, in accordance with various aspects of the present disclosure. Example process 500 is an example where the UE (e.g., UE 120 and/or the like) performs operations related to prioritization associated with a CG change.

As shown in FIG. 5, in some aspects, process 500 may include determining that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells (block 510). For example, the user equipment (UE) (e.g., using receive processor 258, transmit processor 264, controller/processor 280, memory 282, and/or the like) may determine that the UE is to monitor physical downlink control channel (PDCCH) candidates in overlapping PDCCH monitoring occasions on a set of source cells and a set of target cells, as described above. In some aspects, the set of source cells is associated with a first control resource set (CORESET) and the set of target cells is associated with a second CORESET that is different from the first CORESET. In some aspects, the UE is connected to both the set of source cells and the set of target cells during a handover from the set of source cells to the set of target cells.

As further shown in FIG. 5, in some aspects, process 500 may include selecting, based at least in part on a prioritization rule, either the first CORESET or the second CORESET as a CORESET in which to monitor PDCCH candidates (block 520). For example, the user equipment (UE) (e.g., using receive processor 258, transmit processor 264, controller/processor 280, memory 282, and/or the like) may select, based at least in part on a prioritization rule, either the first CORESET or the second CORESET as a CORESET in which to monitor PDCCH candidates, as described above.

As further shown in FIG. 5, in some aspects, process 500 may include monitoring PDCCH candidates in the overlapping PDCCH monitoring occasions in the selected CORESET (block 530). For example, the user equipment (UE) (e.g., using receive processor 258, transmit processor 264, controller/processor 280, memory 282, and/or the like) may monitor PDCCH candidates in the overlapping PDCCH monitoring occasions in the selected CORESET, as described above.

Process 500 may include additional aspects, such as any single aspect or any combination of aspects described below and/or in connection with one or more other processes described elsewhere herein.

In a first aspect, the set of source cells is in a set of source secondary cell groups (SCGs) and the set of target cells is in a set of target SCGs.

In a second aspect, alone or in combination with the first aspect, the first CORESET and the second CORESET have the same quasi co-location TypeD properties.

In a third aspect, alone or in combination with one or more of the first and second aspects, the first CORESET and the second CORESET have different quasi co-location TypeD properties.

In a fourth aspect, alone or in combination with one or more of the first through third aspects, the prioritization rule is based at least in part on search space types associated with the first CORESET and the second CORESET.

In a fifth aspect, alone or in combination with one or more of the first through fourth aspects, the prioritization rule prioritizes CORESETs configured for common search spaces over CORESETs configured for UE-specific search spaces.

In a sixth aspect, alone or in combination with one or more of the first through fifth aspects, the prioritization rule prioritizes CORESETs configured for UE-specific search spaces over CORESETs configured for common search spaces.

In a seventh aspect, alone or in combination with one or more of the first through sixth aspects, the prioritization rule is based at least in part on cell identifiers associated with the set of source cells and cell identifiers associated with the set of target cells.

In an eighth aspect, alone or in combination with one or more of the first through seventh aspects, the prioritization rule prioritizes CORESETs configured for cells with lower cell identifiers over CORESETs configured for cells with higher cell identifiers.

In a ninth aspect, alone or in combination with one or more of the first through eighth aspects, the prioritization rule prioritizes CORESETs configured for cells with higher cell identifiers over CORESETs configured for cells with lower cell identifiers.

In a tenth aspect, alone or in combination with one or more of the first through ninth aspects, the prioritization rule is based at least in part on search space identifiers associated with the first CORESET and the second CORESET.

In an eleventh aspect, alone or in combination with one or more of the first through tenth aspects, the prioritization rule prioritizes CORESETs configured for search spaces with lower search space identifiers over CORESETs configured for search spaces with higher search space identifiers.

In a twelfth aspect, alone or in combination with one or more of the first through eleventh aspects, the prioritization rule prioritizes CORESETs configured for search spaces with higher search space identifiers over CORESETs configured for search spaces with lower search space identifiers.

In a thirteenth aspect, alone or in combination with one or more of the first through twelfth aspects, the prioritization rule is based at least in part on cell types of the set of source cells and the set of target cells.

In a fourteenth aspect, alone or in combination with one or more of the first through thirteenth aspects, the prioritization rule prioritizes CORESETs configured for target cells over CORESETs configured for source cells.

In a fifteenth aspect, alone or in combination with one or more of the first through fourteenth aspects, the prioritization rule prioritizes CORESETs configured for source cells over CORESETs configured for target cells.

In a sixteenth aspect, alone or in combination with one or more of the first through fifteenth aspects, process 500 includes monitoring PDCCH candidates in the overlapping PDCCH monitoring occasions in another CORESET, wherein quasi co-location (QCL) TypeD properties of the other CORESET is matching QCL TypeD properties of the selected CORESET.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
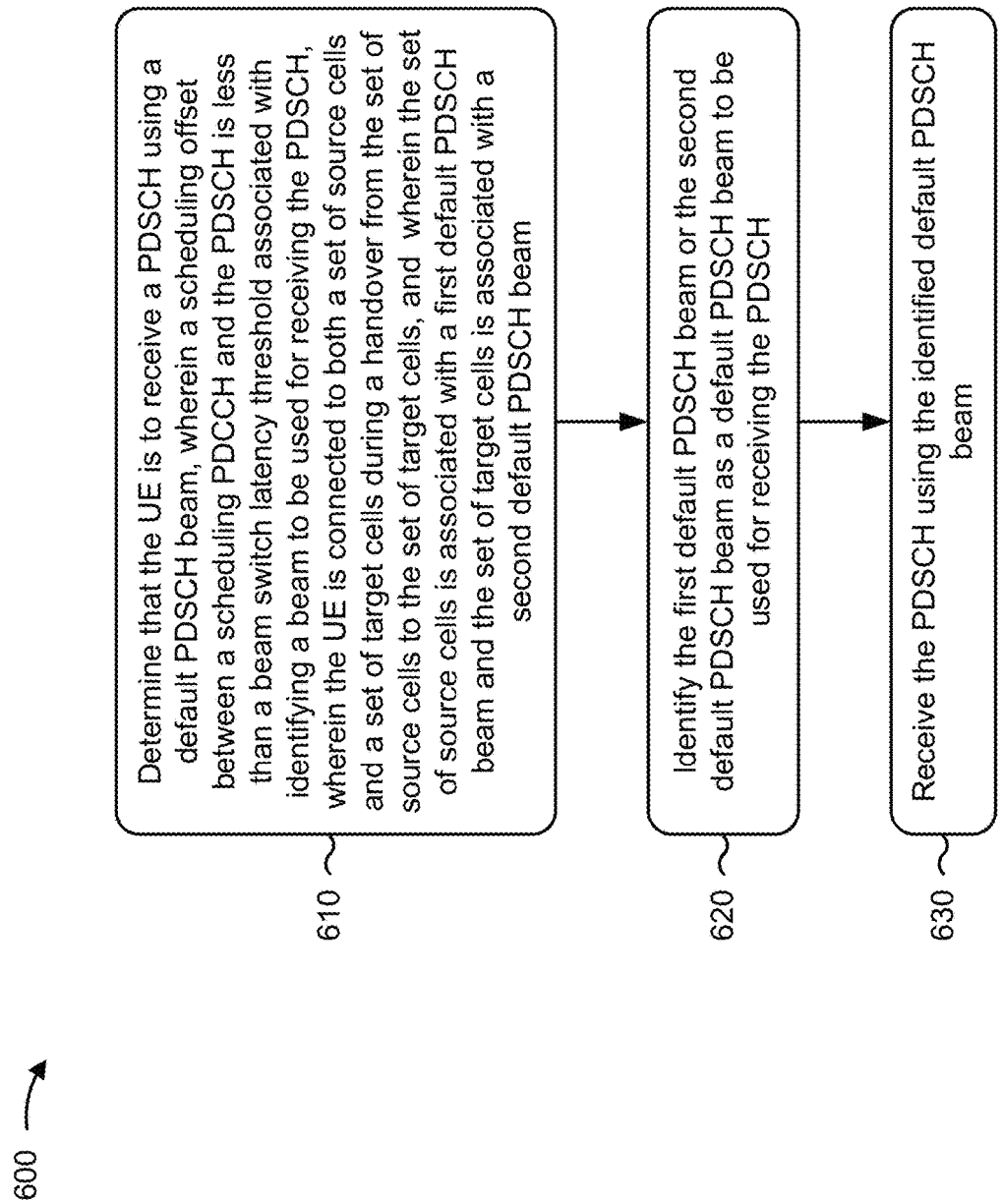

FIG. 6 is a diagram illustrating an example process 600 performed, for example, by a UE, in accordance with various aspects of the present disclosure. Example process 600 is an example where the UE (e.g., UE 120 and/or the like) performs operations related to prioritization associated with a CG change.

As shown in FIG. 6, in some aspects, process 600 may include determining that the UE is to receive a physical downlink shared channel (PDSCH) using a default PDSCH beam, wherein a scheduling offset between a scheduling physical downlink control channel (PDCCH) and the PDSCH is less than a beam switch latency threshold associated with identifying a beam to be used for receiving the PDSCH, wherein the UE is connected to both a set of source cells and a set of target cells during a handover from the set of source cells to the set of target cells, and wherein the set of source cells is associated with a first default PDSCH beam and the set of target cells is associated with a second default PDSCH beam (block 610). For example, the user equipment (UE) (e.g., using receive processor 258, transmit processor 264, controller/processor 280, memory 282, and/or the like) may determine that the UE is to receive a physical downlink shared channel (PDSCH) using a default PDSCH beam, as described above. In some aspects, a scheduling offset between a scheduling physical downlink control channel (PDCCH) and the PDSCH is less than a beam switch latency threshold associated with identifying a beam to be used for receiving the PDSCH. In some aspects, the UE is connected to both a set of source cells and a set of target cells during a handover from the set of source cells to the set of target cells. In some aspects, the set of source cells is associated with a first default PDSCH beam and the set of target cells is associated with a second default PDSCH beam.

As further shown in FIG. 6, in some aspects, process 600 may include identifying the first default PDSCH beam or the second default PDSCH beam as a default PDSCH beam to be used for receiving the PDSCH (block 620). For example, the user equipment (UE) (e.g., using receive processor 258, transmit processor 264, controller/processor 280, memory 282, and/or the like) may identify the first default PDSCH beam or the second default PDSCH beam as a default PDSCH beam to be used for receiving the PDSCH, as described above.

As further shown in FIG. 6, in some aspects, process 600 may include receiving the PDSCH using the identified default PDSCH beam (block 630). For example, the user equipment (UE) (e.g., using receive processor 258, transmit processor 264, controller/processor 280, memory 282, and/or the like) may receive the PDSCH using the identified default PDSCH beam, as described above.

Process 600 may include additional aspects, such as any single aspect or any combination of aspects described below and/or in connection with one or more other processes described elsewhere herein.

In a first aspect, the set of source cells is in a set of source secondary cell groups (SCGs) and the set of target cells is in a set of target SCGs.

In a second aspect, alone or in combination with the first aspect, when a single default PDSCH beam is to be used for receiving the PDSCH, the second default PDSCH beam, associated with the set of target cells, is identified as the default PDSCH beam to be used for receiving the PDSCH.

In a third aspect, alone or in combination with one or more of the first and second aspects, when a single default PDSCH beam is to be used for receiving the PDSCH, the first default PDSCH beam, associated with the set of source cells, is identified as the default PDSCH beam to be used for receiving the PDSCH.

In a fourth aspect, alone or in combination with one or more of the first through third aspects, when a single default PDSCH beam is to be used for receiving the PDSCH, the default PDSCH beam to be used for receiving the PDSCH is to switch between the first default PDSCH beam, associated with the set of source cells, and the second default PDSCH beam, associated with the set of target cells, at a particular interval.

In a fifth aspect, alone or in combination with one or more of the first through fourth aspects, when multiple default PDSCH beams are to be used for receiving the PDSCH, both the first default PDSCH beam, associated with the set of source cells, and the second default PDSCH beam, associated with the set of source cells, are identified for receiving the PDSCH.

In a sixth aspect, alone or in combination with one or more of the first through fifth aspects, the default PDSCH beam is identified based at least in part on a default PDSCH beam pattern configured on the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
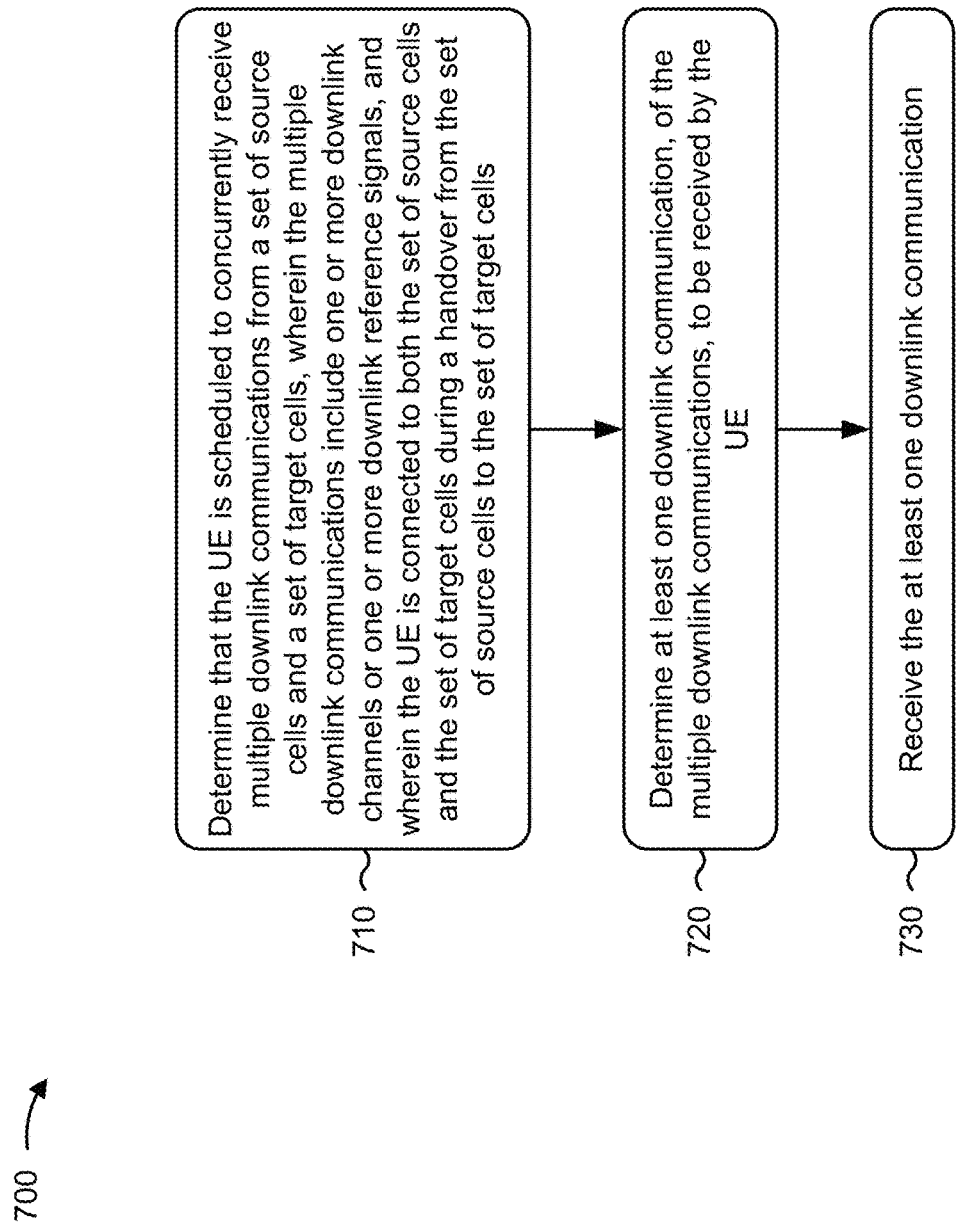

FIG. 7 is a diagram illustrating an example process 700 performed, for example, by a UE, in accordance with various aspects of the present disclosure. Example process 700 is an example where the UE (e.g., UE 120 and/or the like) performs operations related to prioritization associated with a CG change.

As shown in FIG. 7, in some aspects, process 700 may include determining that the UE is scheduled to concurrently receive multiple downlink communications from a set of source cells and a set of target cells, wherein the multiple downlink communications include one or more downlink channels or one or more downlink reference signals, and wherein the UE is connected to both the set of source cells and the set of target cells during a handover from the set of source cells to the set of target cells (block 710). For example, the user equipment (UE) (e.g., using receive processor 258, transmit processor 264, controller/processor 280, memory 282, and/or the like) may determine that the UE is scheduled to concurrently receive multiple downlink communications from a set of source cells and a set of target cells, as described above. In some aspects, the multiple downlink communications include one or more downlink channels or one or more downlink reference signals. In some aspects, the UE is connected to both the set of source cells and the set of target cells during a handover from the set of source cells to the set of target cells.

As further shown in FIG. 7, in some aspects, process 700 may include determining at least one downlink communication, of the multiple downlink communications, to be received by the UE (block 720). For example, the user equipment (UE) (e.g., using receive processor 258, transmit processor 264, controller/processor 280, memory 282, and/or the like) may determine at least one downlink communication, of the multiple downlink communications, to be received by the UE, as described above.

As further shown in FIG. 7, in some aspects, process 700 may include receiving the at least one downlink communication (block 730). For example, the user equipment (UE) (e.g., using receive processor 258, transmit processor 264, controller/processor 280, memory 282, and/or the like) may receive the at least one downlink communication, as described above.

Process 700 may include additional aspects, such as any single aspect or any combination of aspects described below and/or in connection with one or more other processes described elsewhere herein.

In a first aspect, the set of source cells is in a set of source secondary cell groups (SCGs) and the set of target cells is in a set of target SCGs.

In a second aspect, alone or in combination with the first aspect, downlink communications from the set of source cells and the set of target cells are associated with different quasi co-location relations for downlink beam determination.

In a third aspect, alone or in combination with one or more of the first and second aspects, the at least one downlink communication is determined according to a prioritization rule that prioritizes downlink communications based at least in part on downlink communication type.

In a fourth aspect, alone or in combination with one or more of the first through third aspects, the downlink communication type includes at least one of.

In a fifth aspect, alone or in combination with one or more of the first through fourth aspects, the at least one downlink communication is determined according to a prioritization rule that prioritizes downlink communications based at least in part on cell attributes.

In a sixth aspect, alone or in combination with one or more of the first through fifth aspects, the cell attributes include at least one of.

In a seventh aspect, alone or in combination with one or more of the first through sixth aspects, the set of source cells and the set of target cells are associated with a same quasi co-location relation for the UE to receive each of the multiple downlink communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
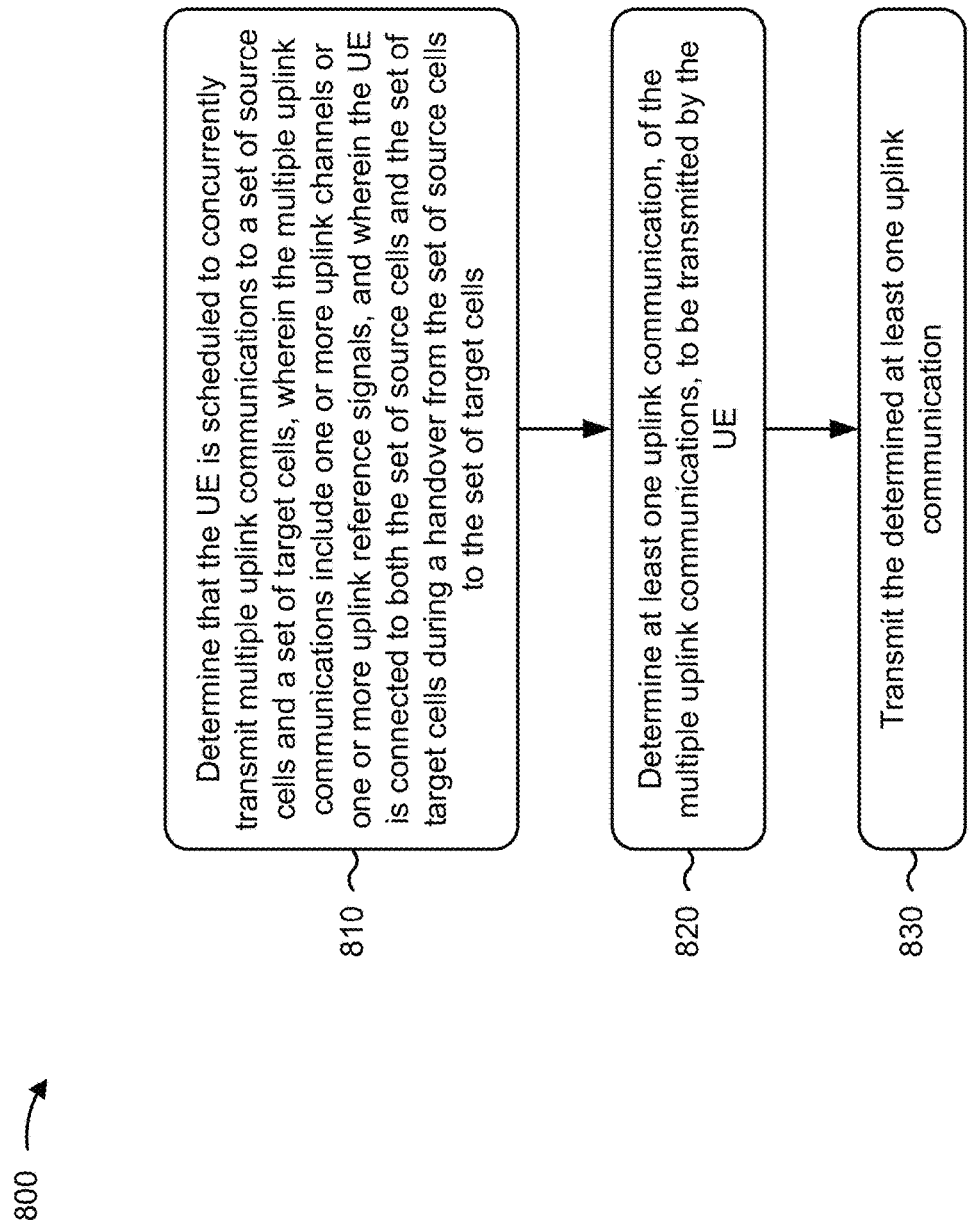

FIG. 8 is a diagram illustrating an example process 800 performed, for example, by a UE, in accordance with various aspects of the present disclosure. Example process 800 is an example where the UE (e.g., UE 120 and/or the like) performs operations related to prioritization associated with a CG change.

As shown in FIG. 8, in some aspects, process 800 may include determining that the UE is scheduled to concurrently transmit multiple uplink communications to a set of source cells and a set of target cells, wherein the multiple uplink communications include one or more uplink channels or one or more uplink reference signals, and wherein the UE is connected to both the set of source cells and the set of target cells during a handover from the set of source cells to the set of target cells (block 810). For example, the user equipment (UE) (e.g., using receive processor 258, transmit processor 264, controller/processor 280, memory 282, and/or the like) may determine that the UE is scheduled to concurrently transmit multiple uplink communications to a set of source cells and a set of target cells, as described above. In some aspects, the multiple uplink communications include one or more uplink channels or one or more uplink reference signals. In some aspects, the UE is connected to both the set of source cells and the set of target cells during a handover from the set of source cells to the set of target cells.

As further shown in FIG. 8, in some aspects, process 800 may include determining at least one uplink communication, of the multiple uplink communications, to be transmitted by the UE (block 820). For example, the user equipment (UE) (e.g., using receive processor 258, transmit processor 264, controller/processor 280, memory 282, and/or the like) may determine at least one uplink communication, of the multiple uplink communications, to be transmitted by the UE, as described above.

As further shown in FIG. 8, in some aspects, process 800 may include transmitting the determined at least one uplink communication (block 830). For example, the user equipment (UE) (e.g., using receive processor 258, transmit processor 264, controller/processor 280, memory 282, and/or the like) may transmit the determined at least one uplink communication, as described above.

Process 800 may include additional aspects, such as any single aspect or any combination of aspects described below and/or in connection with one or more other processes described elsewhere herein.

In a first aspect, the set of source cells is in a set of source secondary cell groups (SCGs) and the set of target cells is in a set of target SCGs.

In a second aspect, alone or in combination with the first aspect, the set of source cells and the set of target cells are associated with different spatial relations for uplink beam determination.

In a third aspect, alone or in combination with one or more of the first and second aspects, the at least one uplink communication is determined according to a prioritization rule that prioritizes uplink communications based at least in part on uplink communication type.

In a fourth aspect, alone or in combination with one or more of the first through third aspects, the uplink communication type includes at least one of.

In a fifth aspect, alone or in combination with one or more of the first through fourth aspects, the at least one uplink communication is determined according to a prioritization rule that prioritizes uplink communications based at least in part on cell attributes.

In a sixth aspect, alone or in combination with one or more of the first through fifth aspects, the cell attributes include at least one of.

In a seventh aspect, alone or in combination with one or more of the first through sixth aspects, the set of source cells and the set of target cells are associated with a same spatial relation for the UE to transmit each of the multiple uplink communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
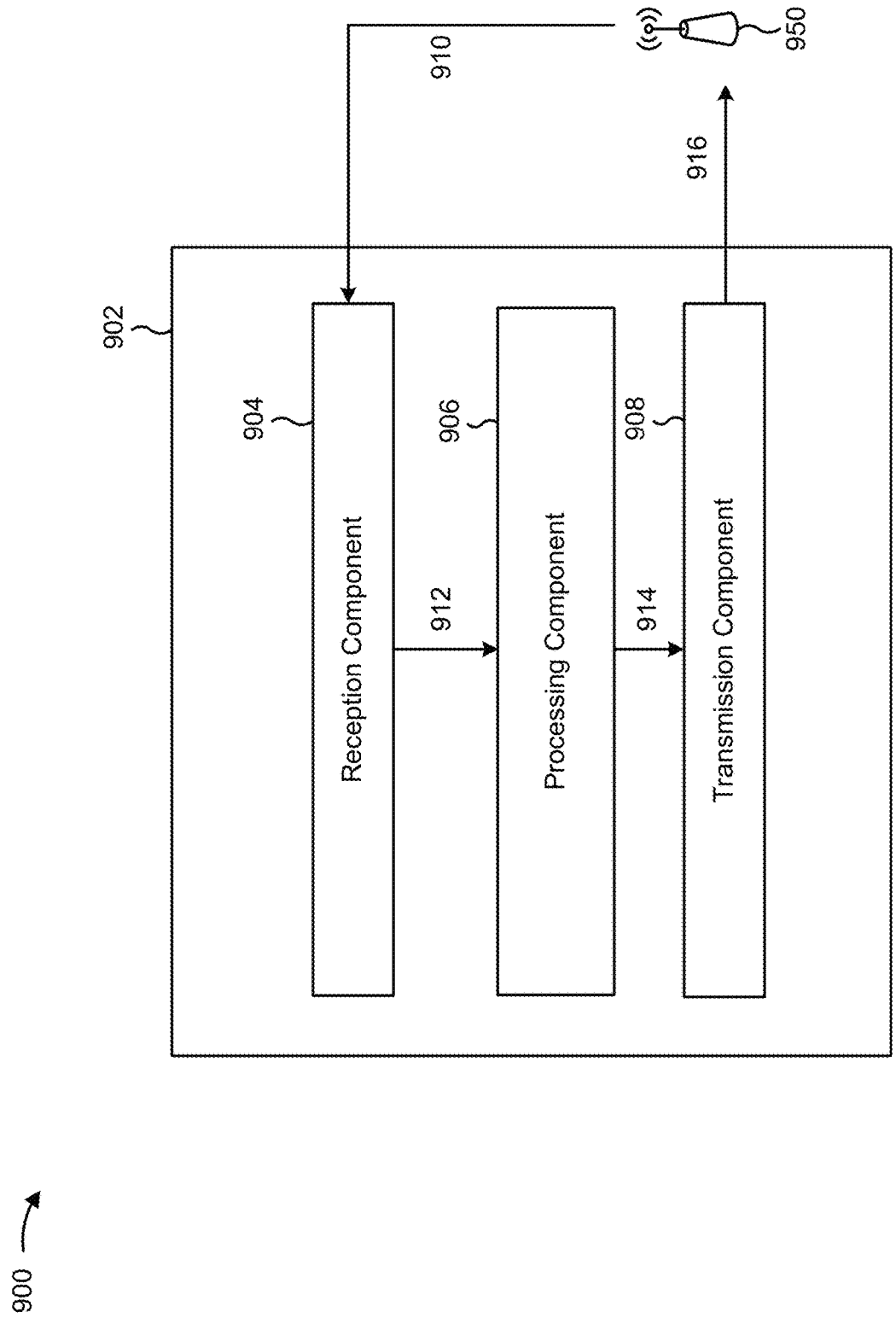
FIG. 9 is a conceptual data flow diagram illustrating data flow between different modules/means/components in an example apparatus, in accordance with various aspects of the present disclosure.

FIG. 9 is a conceptual data flow diagram 900 illustrating data flow between different modules/means/components in an example apparatus 902. The apparatus 902 may be a UE (e.g., UE 120). In some aspects, the apparatus 902 includes a reception component 904, a processing component 906, and/or a transmission component 908.

In some aspects, reception component 904 may perform one or more operations associated with receiving data 910 provided by apparatus 950 (which may be a base station 110). In some aspects, the one or more operations performed by reception component 904 may include one or more receiving, connecting, disconnecting, or monitoring operations as described above in association with example 300 of FIG. 3, process 400 of FIG. 4, process 500 of FIG. 5, process 600 of FIG. 6, process 700 of FIG. 7, process 800 of FIG. 8. As shown, in some aspects, reception component 904 may provide data 912 to processing component 906 based at least in part on one or more operations performed by reception component 904.

In some aspects, processing component 906 may perform one or more operations associated with data 912 provided by reception component 904. In some aspects, the one or more operations performed by processing component 906 may include one or more connecting, disconnecting, determining, selecting, monitoring, or identifying operations as described above in association with example 300 of FIG. 3, process 400 of FIG. 4, process 500 of FIG. 5, process 600 of FIG. 6, process 700 of FIG. 7, process 800 of FIG. 8. As shown, in some aspects, processing component 906 may provide data 914 to transmission component 908 based at least in part one or more operations performed by processing component 906.

In some aspects, transmission component 908 may perform one or more operations associated with data 914 provided by processing component 906. In some aspects, the one or more operations performed by transmission component 908 may include one or more transmitting, connecting, or disconnecting operations as described above in association with example 300 of FIG. 3, process 400 of FIG. 4, process 500 of FIG. 5, process 600 of FIG. 6, process 700 of FIG. 7, process 800 of FIG. 8. As shown, in some aspects, transmission component 908 may transmit data 916 to apparatus 950 based at least in part on one or more operations performed by transmission component 908.

The apparatus 902 may include additional components that perform each of the blocks of the algorithm in the aforementioned process 400 of FIG. 4, process 500 of FIG. 5, process 600 of FIG. 6, process 700 of FIG. 7, process 800 of FIG. 8, and/or the like. Each block in the aforementioned process 400 of FIG. 4, process 500 of FIG. 5, process 600 of FIG. 6, process 700 of FIG. 7, process 800 of FIG. 8, and/or the like may be performed by a component and the apparatus may include one or more of those components.

The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors coupled to the one or more memories, the one or more processors individually or collectively configured to:
   determine that the UE is to monitor physical downlink control channel (PDCCH) candidates in overlapping PDCCH monitoring occasions on a set of source cells and a set of target cells,
   wherein the set of source cells is associated with a first control resource set (CORESET) and the set of target cells is associated with a second CORESET that is different from the first CORESET, and
   wherein the UE is connected to both the set of source cells and the set of target cells during a handover from the set of source cells to the set of target cells;
   select, based at least in part on a prioritization rule, either the first CORESET or the second CORESET as a selected CORESET in which to monitor PDCCH candidates; and
   monitor PDCCH candidates in the overlapping PDCCH monitoring occasions in the selected CORESET.

2. The UE of claim 1, wherein the set of source cells is in a set of source secondary cell groups (SCGs) and the set of target cells is in a set of target SCGs.

3. The UE of claim 1, wherein the first CORESET and the second CORESET have a same quasi co-location TypeD properties.

4. The UE of claim 1, wherein the first CORESET and the second CORESET have different quasi co-location TypeD properties.

5. The UE of claim 1, wherein the prioritization rule is based at least in part on search space types associated with the first CORESET and the second CORESET.

6. The UE of claim 1, wherein the prioritization rule is based at least in part on at least one of:
   cell identifiers associated with the set of source cells and cell identifiers associated with the set of target cells,
   search space identifiers associated with the first CORESET and the second CORESET, or
   cell types of the set of source cells and the set of target cells.

7. The UE of claim 1, wherein the one or more processors are further configured to:
   monitor PDCCH candidates in the overlapping PDCCH monitoring occasions in another CORESET,
   wherein quasi co-location (QCL) TypeD properties of the other CORESET match QCL TypeD properties of the selected CORESET.

8. A method of wireless communication at a user equipment (UE), comprising:
   determining that the UE is to monitor physical downlink control channel (PDCCH) candidates in overlapping PDCCH monitoring occasions on a set of source cells and a set of target cells, wherein the set of source cells is associated with a first control resource set (CORESET) and the set of target cells is associated with a second CORESET that is different from the first CORESET, and wherein the UE is connected to both the set of source cells and the set of target cells during a handover from the set of source cells to the set of target cells;

selecting, based at least in part on a prioritization rule, either the first CORESET or the second CORESET as a selected CORESET in which to monitor PDCCH candidates; and monitoring PDCCH candidates in the overlapping PDCCH monitoring occasions in the selected CORESET.

9. The method of claim 8, wherein the set of source cells is in a set of source secondary cell groups (SCGs) and the set of target cells is in a set of target SCGs.

10. The method of claim 8, wherein the first CORESET and the second CORESET have a same quasi co-location TypeD properties.

11. The method of claim 8, wherein the first CORESET and the second CORESET have different quasi co-location TypeD properties.

12. The method of claim 8, wherein the prioritization rule is based at least in part on search space types associated with the first CORESET and the second CORESET.

13. The method of claim 8, wherein the prioritization rule is based at least in part on at least one of:
cell identifiers associated with the set of source cells and cell identifiers associated with the set of target cells,
search space identifiers associated with the first CORESET and the second CORESET, or
cell types of the set of source cells and the set of target cells.

14. The method of claim 8, further comprising:
monitoring PDCCH candidates in the overlapping PDCCH monitoring occasions in another CORESET,
wherein quasi co-location (QCL) TypeD properties of the other CORESET match QCL TypeD properties of the selected CORESET.

15. A non-transitory computer-readable medium storing a set of instructions for wireless communication, the set of instructions comprising:
one or more instructions that, when executed by one or more processors of a user equipment (UE), cause the UE to:
determine that the UE is to monitor physical downlink control channel (PDCCH) candidates in overlapping PDCCH monitoring occasions on a set of source cells and a set of target cells,
wherein the set of source cells is associated with a first control resource set (CORESET) and the set of target cells is associated with a second CORESET that is different from the first CORESET, and
wherein the UE is connected to both the set of source cells and the set of target cells during a handover from the set of source cells to the set of target cells;
select, based at least in part on a prioritization rule, either the first CORESET or the second CORESET as a selected CORESET in which to monitor PDCCH candidates; and
monitor PDCCH candidates in the overlapping PDCCH monitoring occasions in the selected CORESET.

16. The non-transitory computer-readable medium of claim 15, wherein the set of source cells is in a set of source secondary cell groups (SCGs) and the set of target cells is in a set of target SCGs.

17. The non-transitory computer-readable medium of claim 15, wherein the first CORESET and the second CORESET have different quasi co-location TypeD properties.

18. The non-transitory computer-readable medium of claim 15, wherein the prioritization rule is based at least in part on search space types associated with the first CORESET and the second CORESET.

19. The non-transitory computer-readable medium of claim 15, wherein the prioritization rule is based at least in part on at least one of:
cell identifiers associated with the set of source cells and cell identifiers associated with the set of target cells,
search space identifiers associated with the first CORESET and the second CORESET, or
cell types of the set of source cells and the set of target cells.

20. The non-transitory computer-readable medium of claim 15, wherein the one or more instructions further cause the UE to:
monitor PDCCH candidates in the overlapping PDCCH monitoring occasions in another CORESET,
wherein quasi co-location (QCL) TypeD properties of the other CORESET match QCL TypeD properties of the selected CORESET.

* * * * *